April 18, 1933.  H. L. CROWLEY  1,904,273

METHOD OF PRODUCING AN ARTICLE OF MANUFACTURE

Filed Jan. 14, 1929

HENRY L. CROWLEY
INVENTOR

BY Darby & Darby
ATTORNEYS

Patented Apr. 18, 1933

1,904,273

UNITED STATES PATENT OFFICE

HENRY L. CROWLEY, OF EAST ORANGE, NEW JERSEY, ASSIGNOR TO HENRY L. CROWLEY & CO., INC., OF EAST ORANGE, NEW JERSEY, A CORPORATION OF NEW JERSEY

METHOD OF PRODUCING AN ARTICLE OF MANUFACTURE

Application filed January 14, 1929. Serial No. 332,555.

This invention relates to new composition of matter and to the method of producing the same.

The object of the invention is to provide a new composition of matter and the method of producing the composition, it having practically unlimited utility and the method permitting predetermination of physical characteristics of the product within wide limits. Therefore, the invention consists of a new substance (and variations thereof permitted within the scientific laws) as well as the method of producing this new substance, irrespective of the specific use to which the new substance may be put, as will be hereinafter pointed out. The particular requirements of any particular product determine to a large extent, the ingredients of the new substance.

The periodic table of Mendelejeff is now universally recognized as definitely establishing certain relations and lack of relations between the various elements of the universe. Using the periodic table as a starting point I have discovered that a law may be formulated based thereon and applicable to a portion, at least, of the periodic table. This discovery is of great scientific significance and from it great practical commercial benefits may be derived. While my investigations have not been carried on to an extent which warrants a statement at this time based on exhaustive, conclusive work that the law is universally applicable to the periodic table, nevertheless, they have been completed to a point where it can be conclusively stated that the new law is definitely applicable to certain portions of the periodic table and particularly to the portions that pertain to metals. Furthermore, while the periodic table has been confined principally to the pure elements of nature, the law which I have evolved is not, of necessity, confined to the pure elements, but applies to the elements having at least one physical characteristic in common.

Briefly stated, the law which I have evolved based on the periodic table, is that the powdered forms of metals located between definite parallel lines diagonally drawn on a charted periodic table have similar physical characteristics.

My investigations have established that this law which, for want of a better name, may be termed the diagonal law of the periodic table, is strictly applicable to the oxides of the metals. While my investigations thus far have not conclusively established the fact they strongly indicate that the law is applicable to all metals, in all chemical combinations which have the similar physical characteristic of being obtained or obtainable in powdered form. In other words, any composition having a metal as its base which can be produced in a powdered or pulverized form, such as the pure metal itself or its oxides, carbonates, sulphates, carbides, etc. apparently obey the diagonal law of the periodic table. Inasmuch as my investigations have not been carried to the point where I can conclusively assert that the diagonal law is applicable to all powders of a metallic base, although the indication is strongly to that effect, the present disclosure will be illustrated by oxides of the metals, as to which my investigations have been completed and conclusive results obtained. The diagonal law thus confined may be stated to be that the oxides of metals lying between definite parallel diagonal lines of the charted periodic table have similar physical characteristics. The drawing illustrates a charted table showing the manner of grouping the metallic salts in diagonal groups.

The law thus stated and established as to its correctness obviously opens entirely new fields of investigation with limitless practical, commercial, scientific value, and utility. It would be, perhaps, impossible for any one specific line of investigation thus opened up to be completely exhausted in a life time.

From the practical, commercial viewpoint, the electrical art, both because of its practical importance in our present day life and the necessity for radical improvement therein, has presented a most attractive field for immediate investigation. For this reason, although I do not desire to be limited or restricted thereto I have selected the applicability of the diagonal law of oxides of metals to the electrical art to illustrate the invention here disclosed and broadly claimed in the appended claims.

The oxides of all metals come under two heads, (1) conductors, and (2) non-conductors. The conductors vary widely in their resistance to the flow of electric current therethrough. I have found according to the periodic table that there is a well defined line of division between the oxides of metals that are conductors and the oxides of metals that are non-conductors, which line of division is a diagonal line on the charted periodic table and apparently depends on the series-group relationship between the metals themselves and the atomic weight of the oxides of the metals. By means of this diagonal line of division, one finds the perfect insulators, such as magnesium oxide, zircon, beryllium, etc. Further on the insulator side of the dividing line one finds in accordance with the diagonal law, the electroactive metals, i. e., emitters, such as thoria, strontium oxide, barium oxide, etc.

Still further on the insulator side of the line, one finds in accordance with the diagonal law, radioactive materials, such as uranium oxide, radium oxide, etc.

On the opposite side of the dividing line, one finds in accordance with the diagonal law high resistance conductors, such as chromium oxide, manganese oxide, etc. Still further on the conduction side of the dividing line one finds the conductors having low resistance, such as iron oxide, nickel oxide, etc.

Utilizing the oxides of the metals selected in accordance with the ultimate use to which the product is to be put, and selecting the metals in accordance with the diagonal law of the periodic table under dictate of cost and convenience of procurement, I have been able to produce products having any desired and predetermined electrical characteristics in so far as conductivity, insulation or resistance is concerned.

In other words taking for example, the necessity or desirability of producing in commercial quantities conductor elements of predetermined or fixed resistance, it is well recognized that this is one of the many problems in the electrical art that has remained unsolved. While the resistance element may be produced and its resistance carefully measured, it has been practically impossible to produce that resistance in commercial quantities without a wide variation in electrical characteristics between the supposedly identical products. This has seriously hampered manufacturers in the electrical art, necessitating the design of equipment which permits a comparatively wide variation in resistance to meet the inability of the manufacturers to produce in commercial quantities, at low cost, resistance elements of predetermined resistance characteristics. This, as well as many other problems of the electrical art is solved by the discovery of the diagonal law and the method of practical utilization thereof.

With the diagonal law fixed, the problem next presented consisted of the procedure, treatment or processing of the powdered metal oxide to enable the practical utilization thereof. I will now describe the process employed to produce an ultimate product of an entirely new composition of matter having the predetermined electrical and physical characteristics.

The first determining factor in the production of any ultimate product, in accordance with my invention consists of the use to which the ultimate product is to be put. If the ultimate product is for insulation properties, the oxide or oxides of a metal or metals complying with the diagonal law in the insulation area between the diagonal lines is employed. If a conductor is desired, the oxide or oxides of a metal or metals complying with the diagonal law lying in the area between the diagonal lines on the conductor side is employed. If mixed properties are desired the oxides of mixed metals are employed. Therefore, the oxide or oxides of any desired metal or any mixtures of oxides of metals (depending on the factors of manufacture, such as ultimate use, desired properties, cost, etc.) is obtained in a powdered form, either in the raw state or additionally pulverized, so as to reduce it to powdered form. The powder thus obtained is next fired, i. e. subjected to heat treatment to drive out moisture and impurities. The details of this initial firing form the subject matter of a separate invention for which separate application will be made. It is sufficient to here state that I have discovered that this initial firing below the burning point of the metal oxide used either burns out the impurities or causes them to coagulate into a mass readily separable from the powdered metal oxide.

The next step, where necessary, comprises the sifting of the powdered metallic oxide to separate out the impurities or any particles not ground to a sufficient fineness (depending upon the ultimate use to which the product is to be put). When a mixture of powders is used, depending upon the factors hereinbefore set forth, the next step comprises at this stage thoroughly mixing the powders. This may be accomplished in any suitable way. Mechanical mixers well known, particularly in the ceramic art, are suitable for this purpose. The dried, purified powder then has added to it a removable binder, i. e. some material of a pure character (so as not to add impurities to the mixture) and of a nature that can be easily removed from the product before completion. I find a liquid solution of gum arabic suitable for this purpose, inasmuch as purity can be maintained and firing can insure the burning out thereof from the ultimate product.

A very small amount of binder is utilized. It is desirable in fact to use such a small amount as to maintain the powdered condition of the material. The use of a binder is optional, but for commercial reasons, namely to facilitate handling the use of a binder is preferable.

The powder at this stage of the process is then extruded through a die under considerable pressure. Depending wholly upon the shape of the die, any shape of extruded product is obtained within limits determined by the types of dies that can be made. Thus, it is possible to produce rods of any desirable diameter and length, having any external configuration. Similarly, hollow cylinders or other shapes may be obtained.

Likewise, one or more longitudinally extending orifices, of any desired diameter down to and including the hair-like diameter of a radio vacuum tube filament, may be obtained. The external and internal surfaces of the extruded products can be rough or smooth as desired. In fact all the physical characteristics incident to extrusion can be secured.

The extruded product consists solely of powdered metallic oxide (plus the binder, if used, which is later eliminated), the particles of which have been subjected to sufficient compression, so as to create cohesion therebetween, and the product, while still capable of being broken up into its powdered form, nevertheless has sufficient strength and rigidity to permit being handled and machined. It can have holes bored therethrough; it can be sharply cut away without chipping its edges; it can be turned on a lathe, and, in general, subjected to any and all forms of machining which do not involve excessive pressure or strain.

The product after being machined in accordance with its ultimate use, and the desired shape, etc., is finally baked. The specific details of the baking of the product thus far obtained forms the subject matter of a separate application for a patent and therefore the details thereof need not be here given. In the present case it is sufficient to state that in general the intermediate product thus obtained is subjected to heat in an oven for a period of time and at a temperature depending upon the particular metallic oxide or mixture thereof, and the ultimate use to which the product is to be put. The time of the baking is not particularly critical.

Likewise the heat of baking (which likewise is a factor in determining the length of time of baking) may be varied within wide limits. As a rule, however, and except in exceptional circumstances the baking temperature should not exceed the fusing point of the metallic oxide employed. When the product thus obtained is taken from the oven and cooled, its physical characteristics (other than size and shape, except for shrinkage in some instances) have been altered completely. A hard, strong, light, non-brittle, non-ductile structure with high tensile strength is obtained. Its conductivity and insulation properties are controlled entirely by the powdered ingredients thereof. It is practically non-breakable and is harder than glass, tool steel, etc. It is a resistant to heat, has a negligible coefficient of thermal expansion, resists chemical reaction, is non-corrosive and is smooth, porous or non-porous as desired. The product obtained in accordance with my invention has utility in practically all of the arts. In the electrical arts its utility as an insulator, resistor, conductor, emitter, spark plug, etc. will be readily apparent. Due to its resistance to high heat it is useful for oil burning parts, spark plugs, pyrometer tubes, etc. Its extreme hardness makes it available for use as scale bearings, etc. Indeed, the utility of the product is as broad as the arts and sciences. No product of this character has ever to my knowledge been heretofore produced.

As hereinbefore mentioned by employing ingredients selected in accordance with the use to which the ultimate product is to be put it is possible to provide practically indestructible insulators, resistors, conductors, emitters, etc. in the electrical arts and in fact a new composition which may be utilized in any art where a product or products containing the physical characteristics of my product is desirable.

It will be apparent that many modifications and changes in the process of producing the product will readily occur to those skilled in the art without departing from the spirit and scope of my invention as defined in the claims. It will likewise be apparent that the physical characteristics of any particular product can be varied at will and I therefore desire to have the foregoing description regarded in the illustrative and not in the limiting sense. Furthermore, it will be understood that, where as in the appended claims I refer to a metal in a powdered form, or powdered metal, I intend to include by that expression either the pure metal or any powder having a metal as its base irrespective of whether it be the pure metal, an oxide or some other form. But having now set forth the objects and nature of my invention and having described my new composition of matter and the process of producing the same, what I claim as new and useful and of my own invention and desire to secure by Letters Patent is:—

1. The method which consists in reducing a metal to powder, subjecting the powdered metal to a heat below the fusion point of the metal, then extruding the powder to solidify the same and finally baking the solidified mass.

2. The method of producing an insulator body from a powdered metal oxide which comprises subjecting the powdered metal oxide to heat below the fusion point thereof, extruding the powdered metal oxide under pressure to solidify the same, and finally heat treating the solidified mass.

In testimony whereof I have hereunto set my hand on this 10th day of January A. D., 1929.

HENRY L. CROWLEY.